(12) United States Patent
Crawford (10) Patent No.: US 7,954,088 B2
(45) Date of Patent: May 31, 2011

(54) METHOD AND APPARATUS FOR EXECUTING UNIT TESTS IN APPLICATION HOST ENVIRONMENT

(75) Inventor: Brian R. Crawford, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 1138 days.

(21) Appl. No.: 11/087,260

(22) Filed: Mar. 23, 2005

(65) Prior Publication Data

US 2006/0218446 A1 Sep. 28, 2006

(51) Int. Cl.
*G06F 9/44* (2006.01)
*G06F 11/00* (2006.01)

(52) U.S. Cl. ............ 717/126; 717/127; 717/131; 714/25
(58) Field of Classification Search .................. None
See application file for complete search history.

(56) References Cited

U.S. PATENT DOCUMENTS

| | | | | |
|---|---|---|---|---|
| 6,035,303 A * | 3/2000 | Baer et al. | ............... | 1/1 |
| 6,083,281 A * | 7/2000 | Diec et al. | ............... | 717/128 |
| 6,356,946 B1 * | 3/2002 | Clegg et al. | ............... | 709/231 |
| 6,438,559 B1 * | 8/2002 | White et al. | ............... | 1/1 |
| 6,477,701 B1 * | 11/2002 | Heistermann et al. | ........ | 717/108 |
| 6,609,130 B1 * | 8/2003 | Saulpaugh et al. | ........... | 717/116 |
| 6,633,888 B1 * | 10/2003 | Kobayashi | ............... | 1/1 |
| 6,745,208 B2 * | 6/2004 | Berg et al. | ............... | 1/1 |
| 6,754,891 B1 * | 6/2004 | Snyder et al. | ................ | 717/128 |
| 7,150,004 B2 * | 12/2006 | Russell et al. | ................ | 717/118 |
| 7,334,162 B1 * | 2/2008 | Vakrat et al. | .................... | 714/38 |
| 7,366,956 B2 * | 4/2008 | Karp et al. | ...................... | 714/38 |
| 7,386,836 B2 * | 6/2008 | Fox et al. | ...................... | 717/120 |
| 7,404,186 B2 * | 7/2008 | Massarenti | .................... | 719/311 |
| 7,467,374 B2 * | 12/2008 | Nishanov et al. | ............. | 717/128 |
| 7,661,096 B2 * | 2/2010 | Meijer et al. | .................... | 717/140 |
| 7,844,948 B2 * | 11/2010 | Fox et al. | ....................... | 717/120 |
| 7,860,983 B1 * | 12/2010 | Mansfield et al. | ............ | 709/227 |
| 2001/0054172 A1 * | 12/2001 | Tuatini | .............................. | 717/1 |
| 2002/0010781 A1 * | 1/2002 | Tuatini | ........................ | 709/227 |
| 2003/0131010 A1 * | 7/2003 | Redpath | ........................ | 707/100 |
| 2003/0131285 A1 * | 7/2003 | Beardsley et al. | .............. | 714/38 |
| 2003/0191803 A1 * | 10/2003 | Chinnici et al. | .............. | 709/203 |
| 2004/0153774 A1 * | 8/2004 | Gavish et al. | ................... | 714/25 |
| 2004/0201600 A1 * | 10/2004 | Kakivaya et al. | ............. | 345/700 |
| 2004/0215797 A1 * | 10/2004 | Hadley | .......................... | 709/230 |

(Continued)

OTHER PUBLICATIONS

Lynn Rampoldi-Hnilo and Jeff English, "Remote Contextual Inquiry: A Technique to Improve Enterprise Software", Apr. 19, 2004, pp. 1-8, <http://www.boxesandarrows.com/view/remote_contextual_inquiry_a_technique_to_improve_enterprise_software>.*

(Continued)

*Primary Examiner* — Thuy Dao
*Assistant Examiner* — Hanh T Bui
(74) *Attorney, Agent, or Firm* — Wolf, Greenfield & Sacks, P.C.

(57) ABSTRACT

A development environment in which unit tests are prepared. The unit tests run in a host environment for more complete and accurate testing of program units. The development environment uses a test execution shim to access an adapter running in the host environment. The host adapter may invoke other program objects that run specific tests. Such objects may late bind to the unit under test. An accessor class may facilitate late binding to the specific unit under test while allowing tests authored in the development environment to use context sensitive information needed to access the unit under test.

20 Claims, 5 Drawing Sheets

U.S. PATENT DOCUMENTS

| | | | | |
|---|---|---|---|---|
| 2005/0071809 | A1* | 3/2005 | Pulley | 717/108 |
| 2005/0183059 | A1* | 8/2005 | Loksh et al. | 717/101 |
| 2005/0204343 | A1* | 9/2005 | Kisamore et al. | 717/124 |
| 2008/0016498 | A1* | 1/2008 | Underseth et al. | 717/124 |
| 2009/0083578 | A1* | 3/2009 | Nan et al. | 714/28 |

OTHER PUBLICATIONS

Ed Ort, "The Java Compatibility Test Tools: JavaTest Harness", Oct. 2001, pp. 1-10, <http://java.sun.com/developer/technicalArticles/JCPtools2/>.*

European Search Report from European Patent Application No. EP 06111470.8, Mar. 30, 2010.

Gao et al., "On Building Testable Software Components," Lecture Notes in Computer Science, vol. 2255, pp. 108-121. 2002.

Campbell et al., "Object-Oriented Perspective on Software System Testing in a Distributed Environment," Hewlett-Packard Journal, vol. 46, No. 6, pp. 75-81. Dec. 1995.

Sosnoski, "Java programming dynamics, Part 8: Replacing reflection with code generation," Java Programming Dynamics, vol. A, pp. 1-9. Jun. 10, 2004.

Bertolino et al., "A Framework for Component Deployment Testing," Proceedings of the 25th International Conference on Software Engineering, pp. 221-231. May 3, 2003.

Philip et al., "Knowledge Mediation in Software Quality Engineering," Software Engineering Conference, pp. 153-159. Aug. 27, 2001.

HarnessIT, http://www.unittesting.com/ downloaded on Jun. 22, 2005, p. 1 to 2.

* cited by examiner

METHOD AND APPARATUS FOR EXECUTING UNIT TESTS IN APPLICATION HOST ENVIRONMENT

BACKGROUND OF INVENTION

1. Field of the Invention

This invention relates generally to software development and more specifically to testing software components.

2. Description of Related Art

It is often desirable to test software as it is being developed, modified or optimized. Software may be tested as a "black box," meaning that inputs are applied to stimulate the software and the outputs produced in response are observed and compared to the expected response for properly functioning software. Testing in this way usually relies on inputs and outputs applied using the existing external interfaces to the software—i.e. the interfaces that would be used to exchange data with the software as it operates.

Figure 1A:
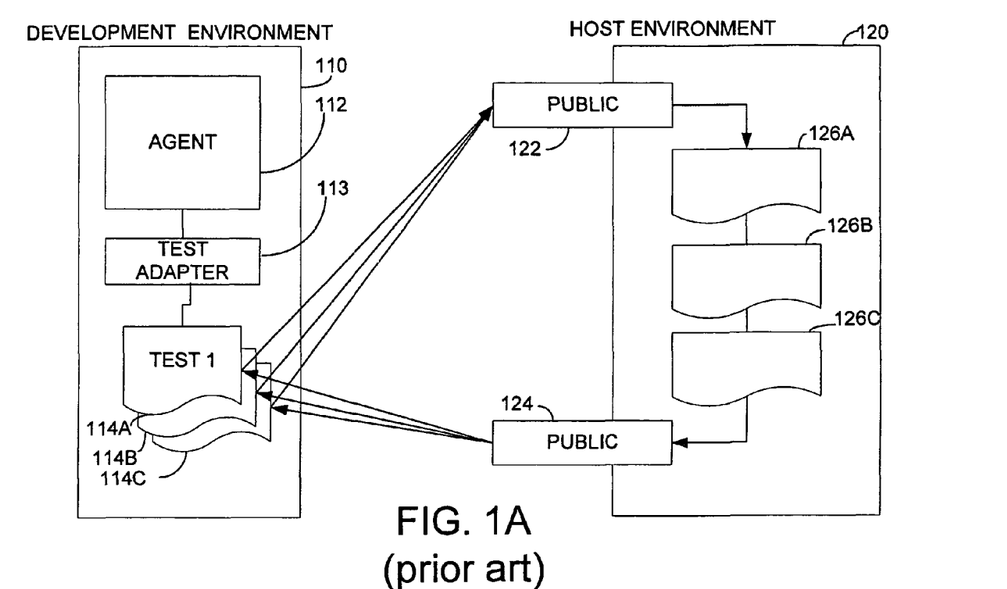
FIG. 1A is a sketch illustrating black box testing as in the prior art.

FIG. 1A illustrates such a testing approach. A development environment 110 and a host environment 120 are used. Tests are prepared in the development environment 110. The program under test operates in host environment 120. Host environment 120 includes interfaces 122 and 124.

The development environment is often a process established on the computer of a developer writing or testing programs. The development environment may have multiple components, such as one component that provides tools to help a developer write programs or tests and another component that provides a test environment for executing tests. The host environment is often a process on the same or a different computer. The host environment is created by the operating system when the host application is started for testing either by a human user or by the development environment.

Development environment 110 contains an agent 112. Agent 112 is a software program that controls the timing and sequencing of individual tests. Agent 112 may also compare results of those tests to expected results and may process or report the results of tests to a human developer or some other part of the system. Agent 112 calls tests, such as 114A, 114B and 114C. In the illustrated embodiment, agent 112 invokes a test through a test adapter 113. Each test to be executed may have its own test adapter providing agent 112 with a standard interface to all tests. Each of the tests applies inputs and observes outputs from a program under test running within a host environment 120.

Host environment 120 may be created by an application that can accept add-in programs through an extensible interface. For example, applications in the Microsoft® Office® suite of applications, such as the Word® word processing application or the Excel® spreadsheet application, accept add-in programs. Add-in programs may be user written or may come from some other source. The add-in programs may be formed from one or more units. In addition, the host environment may include one or more units that also may be tested. In FIG. 1A, the units in host environment 120 to be tested are illustrated generically by units, such as 126A, 126B and 126C.

The units may be tested using black-box testing. For black box testing, the program under test is accessed through an external interface, such as interface 122 or 124. For example, FIG. 1A shows tests 114A . . . 114C applying inputs through interface 122 and obtaining a result through interface 124. By comparing the actual result to an expected result, the performance of the program under test may be validated.

A drawback of testing software as a black box is that it may require many inputs or combinations of inputs to fully exercise all of the units. In addition, if a fault is detected because the expected outputs are not observed in response to a specific set of inputs, it may be difficult to identify the specific unit of code that needs to be modified to correct the fault.

Figure 1B:
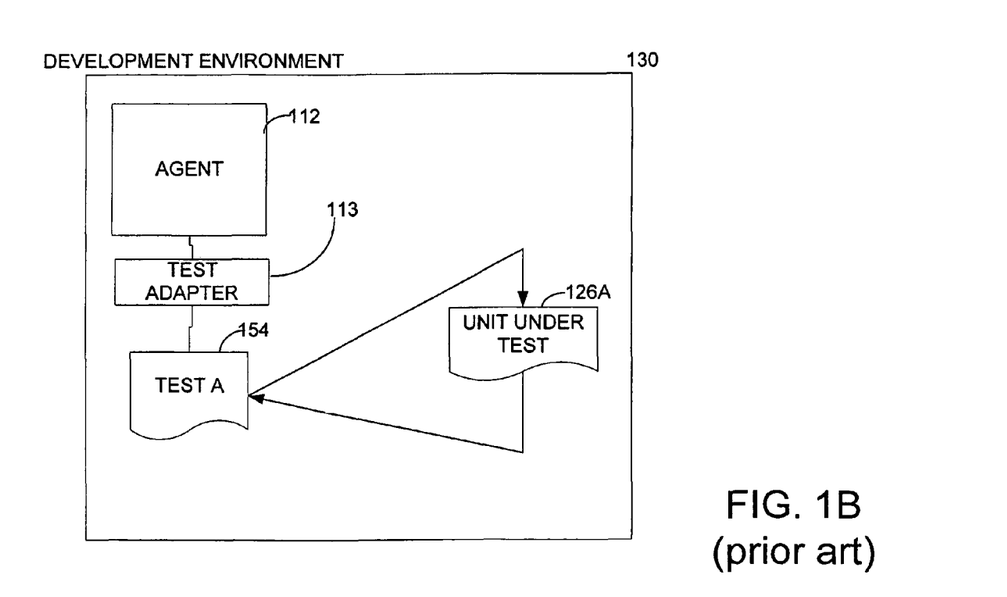
FIG. 1B is a sketch illustrating unit testing as in the prior art.

An alternative approach to testing application programs is shown in FIG. 1B. In FIG. 1B, a unit under test, such as unit 126A, is loaded into the test environment 130. The agent 112, sometimes called a "test harness," similarly controls the selection and sequencing of tests to be performed, such as by calling a test 154. In the example of FIG. 1B, though, the tests are performed on a single unit under test and are performed in the development environment or test environment.

Development environment 130 contains tools to aid the developer in writing tests. For example, the Microsoft® Visual Studio® development environment contains tools that allow a developer to author tests, control execution of those tests and analyze the results. One feature of the tools found in the Microsoft® Visual Studio® development environment is known as Intellisense. The Intellisense feature provides context sensitive help to the user of a code editor. For example, as a user is authoring code that is to access a variable in a program, the Intellisense feature can provide the user with a list of variables in that program, allowing the user to quickly select the correct variable to use or to have the code editor correctly complete instructions as the user begins to input them.

A test developer using the Visual Studio development environment to create tests for the test configuration shown in FIG. 1A can use the Intellisense feature if a project in the host environment containing the code under test is referenced in the project in the development environment containing the test program. However, only public interfaces from a project are available in another project that references it. Accordingly, the Intellisense feature is not available for accessing non-public portions of the units under test.

It would be desirable to have an improved method of testing units of software.

SUMMARY

The invention relates to a method of executing tests for software units that allows the test to be run in the host environment. Testing within the host environment ensures that the host properly initializes the unit under test and allows context information provided by the host application to be available for use during the test. Consequently, more complete and accurate testing is possible. In another aspect, the interface between the development environment and host environment may be provided in such a way that methods, properties and other parameters of the software under test, even if non-public, are made available to the development environment. This feature makes possible the generation of tests for programs that are dynamically instantiated. It also makes it possible to provide context sensitive information for a developer preparing a test program for a specific unit.

In one aspect, the invention relates to a method of testing a program operating in a first environment. Such a method is useful for testing a program having a plurality of units, at least one unit to be tested. The method comprises executing a test agent in a second environment. The test agent specifies a test to be performed to test the unit under test. In response to executing the test agent, a specified test is executed in the first environment. The test generates a test result indicative of the performance of the unit under test. The test result from the specified test operating in the first environment is communicated to the test agent operating in the second environment.

In another aspect, the invention relates to a method of testing a program operating in a first environment. The method is useful for testing a program having a plurality of units, at least one of the units being a unit under test. The method comprises loading the program in the first environment and exposing an interface of an object in the first environment. The object is used to load a test adapter in response to information provided through the interface. The test adapter executes a test of the unit under test.

In a further aspect, the invention relates to a computer-readable medium having computer-executable instructions for performing steps implementing a software system providing a development environment in which a test program may be developed for testing a unit of a program operating in one of a plurality of host environments, the computer-executable instructions performing the steps of: creating a test agent; and creating one of a plurality of host adapters, each host adapter configured to be used by the test agent to invoke execution of a test program in one of the plurality of host environments.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DESCRIPTION OF THE PREFERRED EMBODIMENT

A drawback of the testing method illustrated by FIG. 1B is that unit under test 126A is executed in development environment 130. If unit under test 126A requires context information from host environment 120, that information is not available during the test. Any test of unit under test 126A that exercises a portion of unit under test 126A that accesses or relies on context information from host environment 120 is likely to fail. The test may fail either because the unit under test returns an incorrect result or because the unit under test is unable to operate without the context information.

Further, the method of FIG. 1B may not be used in cases where the code under test is built at runtime. For example, ASP.NET is a programming environment that allows conditions at runtime to define the code that is created. For such code, a test harness can not be built until the code is defined.

Figure 2A:
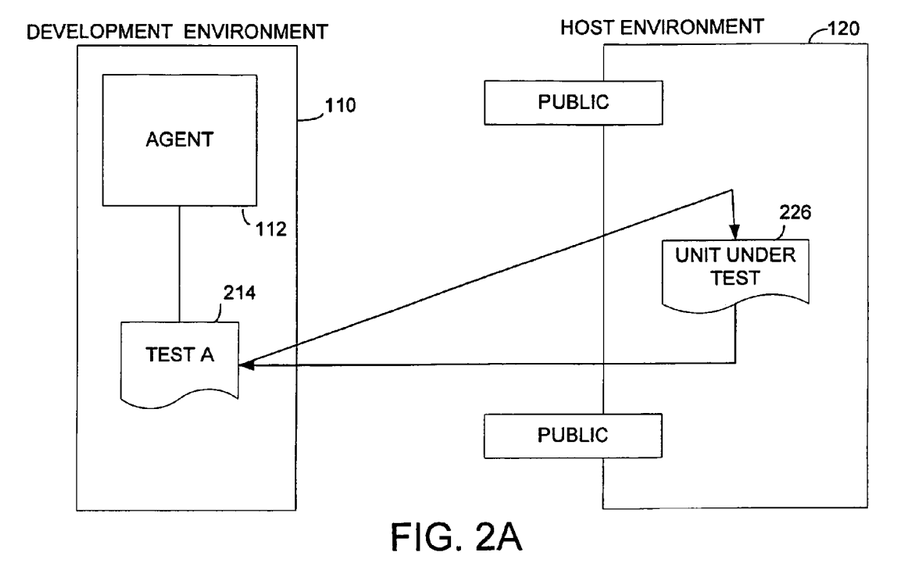
FIG. 2A is a sketch illustrating unit testing according to an embodiment of the invention.

FIG. 2A shows a desirable architecture for test execution. Agent 112 running in a development environment 110 invokes a test 214. Test 214 accesses unit under test 226 running in a host environment 120. Depending on the specific application and the language in which it is programmed, unit under test 226 may be one or a combination of functions, procedures, methods, objects or other constructs in an add-in program or application program in host environment 120.

Figure 2B:
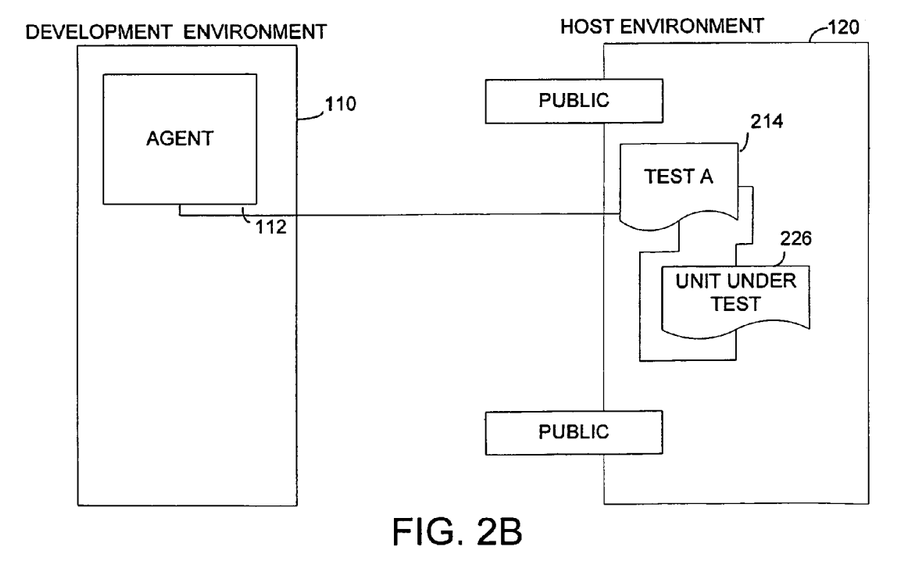
FIG. 2B is a sketch illustrating unit testing according to an alternative embodiment of the invention.

FIG. 2B shows an alternative embodiment. In the embodiment of FIG. 2B, test 214 is executed within host environment 120 and communicates with agent 112 in development environment 110. In this embodiment, test 214 may also have direct access to context information from host environment 120.

The configurations illustrated in FIG. 2A and FIG. 2B allow unit under test 226 to be tested in its host environment. If unit under test 226 depends on any attributes, variables or other parameters in host environment 120, it will have access to those attributes, variables or other parameters when it is tested. Likewise, if the operation of unit under test 226 depends on any initialization performed in host environment 120, unit under test 226 will be initialized in the host environment prior to testing. In comparison to prior art test configurations, a test conducted with the architecture of FIG. 2A or 2B will more accurately represent actual operating conditions and is less likely to fail or create an exception condition when it tries to exercise a portion of the code in unit under test 226 that relies on some parameter of the host environment 120.

The architectures illustrated in FIG. 2A or 2B may be augmented in some circumstances, such as when unit under test 226 includes a non-public interface. As used herein, the term "non-public" interface means an interface that is not accessible using standard features of a programming language from code outside the program area in which that interface is defined using standard features of a programming language. Examples of "non-public" interfaces are those that are termed "internal," "protected" or "private." For example, in some programming languages programs are created in "projects." Referencing one project in another allows public interfaces in one project to be used in the other project, but non-public interfaces are available only within the project in which they are defined.

Additional components may be desirable when the unit under test 226 is dynamically instantiated, compiled or otherwise is not available at the time that a test 214 is compiled or otherwise generated. Augmentation, in these scenarios, may allow tools, such as those including the Intellisense feature, in development environment 110 to properly display context sensitive information needed to author tests that will exercise unit under test 226 even though they do not have direct access to information about the variables, methods or other parameters of unit under test 226.

Figure 3:
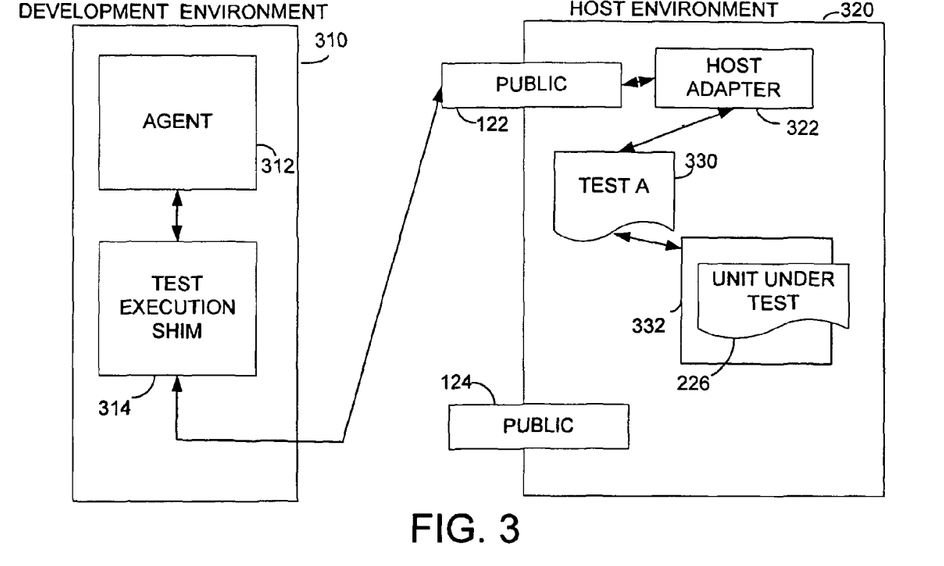
FIG. 3 is a sketch illustrating unit testing according to a further embodiment of the invention.

FIG. 3 shows an alternative embodiment of a test architecture that allows unit under test 226 to be tested in its host environment 120 even if unit under test 226 is not directly accessible. The embodiment of FIG. 3 also demonstrates encapsulation that may be desirable in a commercial development environment. For example, encapsulation allows the development environment to be used in connection with multiple host environments and with multiple tests with only a relatively small number of additional software components to interface with each new host environment or each new test.

In the embodiment of FIG. 3, agent 312 runs in development environment 310. As in the prior art, agent 312 is a program that coordinates the execution of tests, receives results of the tests and interfaces with a user or otherwise reports or uses the results of the tests. In this example, agent 312 is a function written in the C# programming language, but any suitable programming construct may be used to implement an agent.

In the illustrated embodiment, agent 312 interacts with a test execution shim 314. Test execution shim 314 takes the place of a test adapter such as a test adapter 113 called by an agent in the prior art. Where the interface of test execution shim 314 is the same as the interface to test adapter 113, test agent 312 may be constructed as in the prior art or in any other suitable manner.

Test execution shim 314 encapsulates any interfaces specific to host environment 320. In a commercial development environment, the development system may recognize a host type attribute that may be set to reflect the type of host environment 320. Multiple host adapters may be available, allowing the same development environment to be used to prepare tests for multiple host environments. For example, the same development environment may be used to develop tests for add-in programs prepared for a Microsoft® Word® word processing application or a Microsoft® Excel® spreadsheet application. In the embodiment described herein, there may be one test execution shim for each host type. In this example, each test execution shim is a set of Visual Basic Functions, but any suitable programming construct may be used to implement a test execution shim.

Test execution shim 314 provides one side of an interface with a program operating in the host environment. Here, the opposing side of that interface is provided by host adapter 322 in host environment 320. In FIG. 3, communication is shown to be through an interface 122. More generally, communication between the test execution shim 314 and host adapter 322 may be through any suitable communication channel. Depending on the specific implementation of development environment 310 and host environment 320, examples of suitable communication channels include a shared memory space, named pipes, an RPC interface, or a COM interface. As another example, the communication channel may be created using "remoting" constructs in the commercially available NET host environment.

In operation, host environment 320 (or some add-in program) recognizes that the host environment is being operated in a test mode and initiates the host adapter 322. As part of initiating host adapter 322, an interface to host adapter 322 becomes available to programs running in the development environment. Even though operating in test mode, host environment 320 loads and initializes the unit under test 226 so that unit under test 226 will exist in the host environment. Depending on the specific host environment and specific unit under test, host environment 320 may or may not initiate execution of unit under test 226 in test mode. Also, depending on specific implementation, execution of the unit under test may be invoked by the test being performed or in any other suitable way.

The communication channel between the host environment and the development environment allows agent 312 in the development environment to initiate and control execution of a test 330 in the host environment and to receive results from execution of test 330.

The specific implementation of host adapter 322 will depend on the host environment 320. As one example, where host environment 320 is a Microsoft® Office® application, host adapter 322 may be a set of Visual Basic functions. Pseudo code giving an example of a host adapter is included with the computer program listing attached hereto.

The mechanism by which the host environment is placed in test mode will also depend on the implementation of the development environment. In the example of an ASP.NET host environment, execution of a test involves use of an HTTP module. Test execution shim 314 may trigger transmission of an HTTP request including a header that specifies that test mode is to be entered. The request may also indicate the unit to be tested. Regardless of the specific mechanism used to initiate test mode, unit under test 226 is initialized in host environment 320.

Host adapter 322 invokes a specific test 330. For further abstraction, host adapter 322 may access a specific test method through a test adapter (not shown in FIG. 3). Each test may have its own test adapter, with all test adapters presenting a common interface to host adapter 322. In this way, a single host adapter 322 is required for a host environment, but any number of tests may be invoked in the host environment. The specific requirements of each test, such as the number and types of parameters that are provided to the test when the test executes, may be encapsulated in the test adapter.

Once invoked, test 330 interacts with unit under test 226 to stimulate the unit under test and to observe its response to stimulus. Various forms of providing stimulus to the unit under test 226 are possible, depending on the structure and function of the particular unit under test and the nature of the test to be performed. For example, a test may provide stimulus to a unit under test by calling a method of that unit and providing a predetermined value as an argument in the method call.

In the embodiment of FIG. 3, test 330 accesses unit under test 226 through an accessor. An accessor is a program that uses reflection to determine the methods, properties, classes or other parameters of a unit. An accessor may be created by late binding of an accessor class to unit under test 226. When an accessor class is used, the test developer may write a test program such as test 330 referencing the accessor class without knowledge of the details of the unit under test.

One way to create an accessor by late binding of an accessor class is through the use of "reflection." "Reflection" is a characteristic of many programming languages that allows a unit to read a data structure holding information about its methods, properties, classes or other parameters. Reflected information may be used to instantiate the accessor 332 so that it may access the specific unit under test 226 that is the target of the test.

Late binding of accessor 332 may be particularly advantageous where unit under test 226 is dynamically instantiated. Because accessor 332 is available even before unit under test 226 is instantiated, information needed to access unit under test 226 is available in the development environment 310 so that features such as Intellisense may have information needed to display context sensitive information for programs having developing tests or unit under test 226. In this way, test 330 may be prepared using the full range of tools generally available for authorizing code.

It is not necessary that a separate accessor be used to receive information reflected by unit under test 226. As an example of one alternative embodiment, the same functionality could be incorporated into test 330.

As test 330 generates results, those results may be passed back to agent 312. The results may be passed back through host adapter 322. Alternatively, the results may be passed directly to the development environment. For example, agent 312 or test execution shim 314 may include a public interface. Because test 330 may be prepared in the development environment after agent 312 or test execution shim 314, interfaces of agent 312 or test execution shim 314 may be made accessible to test 330.

FIG. 3 is a generalized representation of a unit under test 226 initialized and run in the host environment 320 in response to commands executed by an agent in a development environment 310. The generalized representation includes features that allow tests to be developed in a development environment even when the specific code under test is not known or available at compile time for the test. Such a test architecture may be implemented in any suitable manner compatible with the development environment and host environment.

Figure 4:
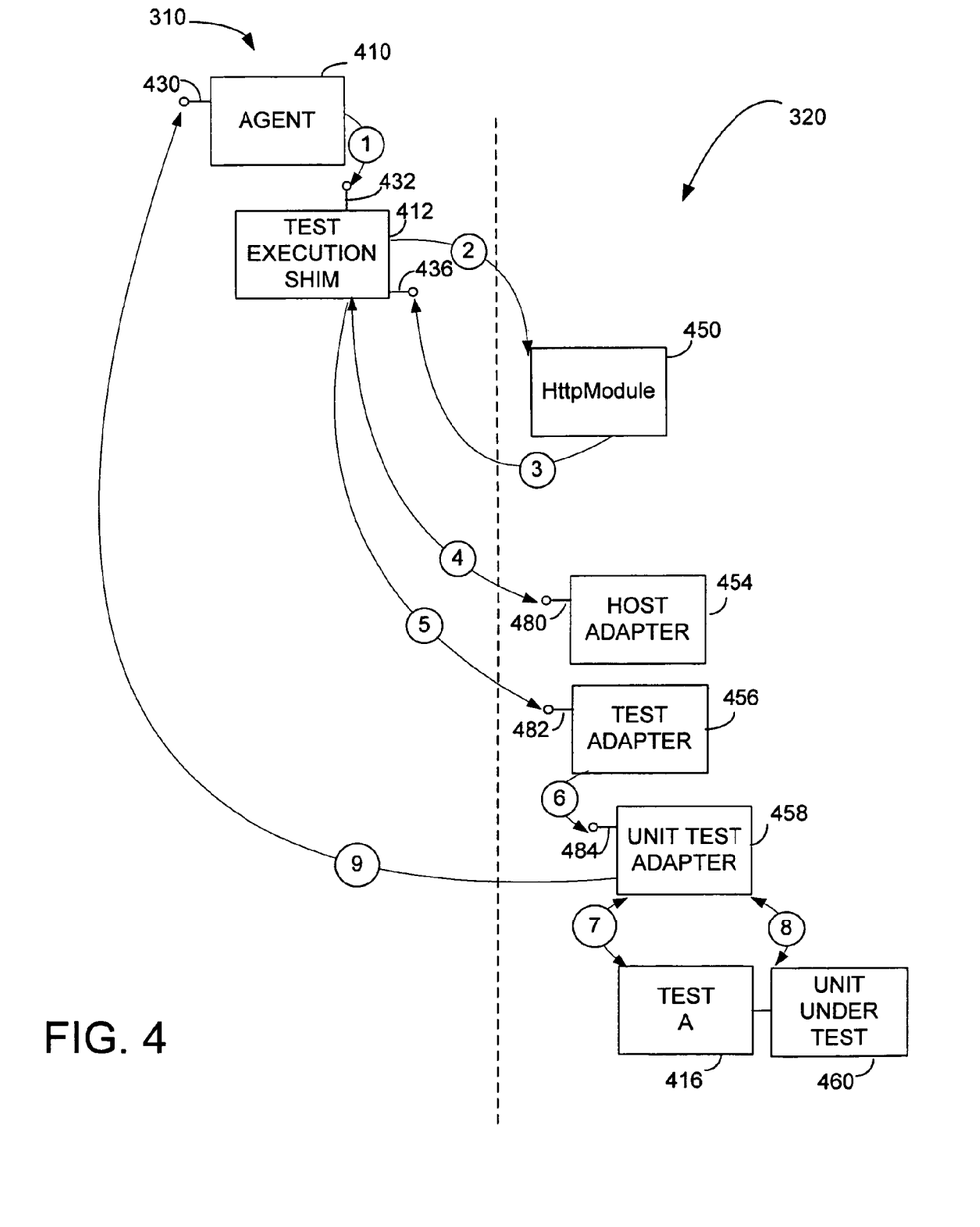
FIG. 4 is a sketch illustrating unit testing according to a further embodiment of the invention.

FIG. 4 is an illustration of a process by which a test prepared in a development environment may be executed in a host environment representative of the ASP.NET environment. Testing in this example may verify operation of the application program that implements a web site. In the described embodiment, the development environment may access the web.config file for the website under test to facilitate interfacing as described.

After authoring one or more tests, a human user may invoke a test through a command line interface in development environment 310. In the example of FIG. 4, running a test causes agent 410 to run in development environment 310 and control execution of the test. In this embodiment, agent 410 may be a program written in the C# language. It may run in the same development environment used to create the tests to be executed or may be run in an entirely separate development environment or even on a different computer.

To test a unit in a particular host environment, agent 410 instantiates a test execution shim 412 adapted to interface to that host environment. In this example, test execution shim 412 contains the interface to the ASP.NET host environment. A development environment may contain multiple test execution shims for each test to be executed. Each test execution shim may serve as a host adapter to a different host environment.

In the described embodiment, the test execution shim, regardless of the specific host environment with which it will interact, has an interface 432 in a defined format. In this way, agent 410 may communicate with any of the test execution shims. Each test may have a separate test execution shim 412 such that agent 410 is provided with an interface through which it can access any desired test. Test execution shim 412 sends commands that access the application in host environment 320 containing the unit under test. In the illustrated embodiment in which the host environment is the ASP.NET environment, access is made by issuing an HTTP request. The HTTP request specifies the program or program object to be tested. In this example, the program object is a page identified by a URL. The HTTP request indicates both that the host environment should be invoked in a test mode and also the specific URL that is the target of the test.

Host environment 320 responds to requests as transmitted by test execution shim 412. In response to a request, an HTTP module 450 is called. The specific HTTP module represented by module 450 may be specifically created in response to the request from test execution shim 412. A new module is used if the module previously called in response to a request has been destroyed. However, where an unused module is not destroyed, it may be used to process the request. Reusing HTTP modules is possible in the ASP.NET host environment because of the stateless nature of ASP.NET. Other host environments may operate differently. The specific format and manner of creation of HTTP module 450 depends on the implementation of host environment 320 and any suitable manner of responding to a test request may be used.

In response to the request from test execution shim 412, HTTP module 450 initializes the target page according to the normal processing in the host environment. In this manner, the unit under test is initialized properly by the host environment and is ready to be tested. In this example, the target page is illustrated as unit under test 460. In addition, HTTP module 450, loads a host adapter 454 and registers it with test execution shim 412, thereby exposing the interface to host adapter 454 to test execution shim 412.

Host adapter 454 provides an interface to development environment 310. In the example of FIG. 4, host adapter 454 is implemented as a C# function.

Host adapter 454 has an interface 480 that may be accessed by a program executing in the development environment. In the illustrated embodiment in which host environment 320 is provided by ASP.NET, an interface to one software program intended for access by programs in other environments may be exposed through the .NET remoting constructs that allow one program to register with another program. Here, the information required to interface with host adapter 454 is made available to test execution shim 412 through interface 436 using a .NET register command.

Once interface 480 is registered with test execution shim 412, test execution shim 412 can communicate with host adapter 454 through interface 480. Through interface 480, test execution shim 412 may request information on the test adapter 456 used to execute a specific test. Any suitable command may be used to obtain information, but in this example a method on interface 480 is used. In this way, test execution shim 412 may gain access to interface 482 of test adapter 456. In this embodiment, test adapter 456 is a wrapper that provides a consistent interface for all tests to be performed in the host environment. Test adapter 456 may be implemented as a C# function or in any other suitable way.

Test adapter 456 creates an instance of a unit test adapter 458 that is specific for the specific test 416 to be performed on unit under test 460. Unit test adapter 458 may be implemented as a C# function or in any other suitable way. Test adapter 456 may be considered an accessor for unit test adapter 456. Unit test adapter 456 may late bind to a specific unit under test by invoking a specific test 416 determined at runtime. Information needed for late binding may be derived from test 416 through reflection or in any other suitable manner.

Unit test adapter 458 includes an interface 484 through which communication with test adapter 456 is possible. Interface 484 need not be exposed in development environment 310 because programs executing in the development environment 310 may communicate through exposed interface 482.

Unit test adapter 458 invokes test 416, allowing test 416 to execute in host environment 320. As an alternative, test functions may be directly incorporated in unit test adapter 458.

Once loaded and properly configured, test 416 may execute. Test 416 may be in a DLL module that can be loaded and run by unit test adapter 458, but any suitable form may be used. Specific commands and context data may be provided through the established interfaces between the development environment 310 and the host environment 320. Results may be supplied back to agent 410 through interface 430.

The specific method of providing an interface between a development environment and a unit under test in a host environment may vary depending on the specifics of the host environment. For example, when the host environment is an application in the Microsoft® Office® application suite, rather than specifying a web page as the test target, a test request sent by a test adapter in the development environment may specify a particular document that includes the unit under test.

Steps in executing a single test are numbered 1, 2 . . . 9 in the order in which they occur is one example. Step 1 represents agent 410 communicating with test execution shim 412. Step 2 represents test execution shim 412 sending the test request to the host environment 320. Step 3 represents HTTP module 450 registering the interface of host adapter 454. Step 4 shows the exchange of information between test execution shim 412 and host adapter 454 that allows test execution shim 412 to communicate through interface 482 of test adapter 456. Step 5 represents communication between test execution shim 412 and test adapter 456 of the information necessary to perform a test. Step 6 indicates communications between test adapter 456 and unit test adapter 458 in the process of running a test. Step 7 indicates communication between unit test adapter 458 and test 416. Test 416 may contain data about how it should be configured. Additionally, data may be exchanged during the course of executing the test. Step 8 indicates information obtained by test adapter 458 from unit under test 460 necessary to configure a test targeting unit under test 460. Step 9 indicates the results of the test are transmitted back to agent 410 in the development environment. The steps are numbered to provide an example of the flow of both the data and control during the execution of a single test. In an actual implementation, the steps need not be performed in the order indicated. Further, each of the steps need not occur a single time. For example, test adapter 414 could on multiple instances send commands or data to test adapter 456.

FIG. 4 shows execution of a single test 416. In testing an actual application program, multiple tests may be performed in a test run. Agent 410 likely controls the invocation of many tests in a test run. Each test in a test run may utilize its own test execution shim 412. Attributes or other settings applicable for the entire test run may be provided in agent 410. Attributes or other settings applicable to a single test may be applied through test execution shim 412 or through unit test adapter 458 or through test 416.

For example, a complete URL to test need not be specified for each test. Rather, some portion of the URL, such as the portion that specifies a particular machine, may be specified once in the test environment. All subsequent references to a URL may be taken to refer to that machine. For example, a machine independent piece, such as that part that specifies a particular page, may be specified for each unit test to be performed.

Figure 5:
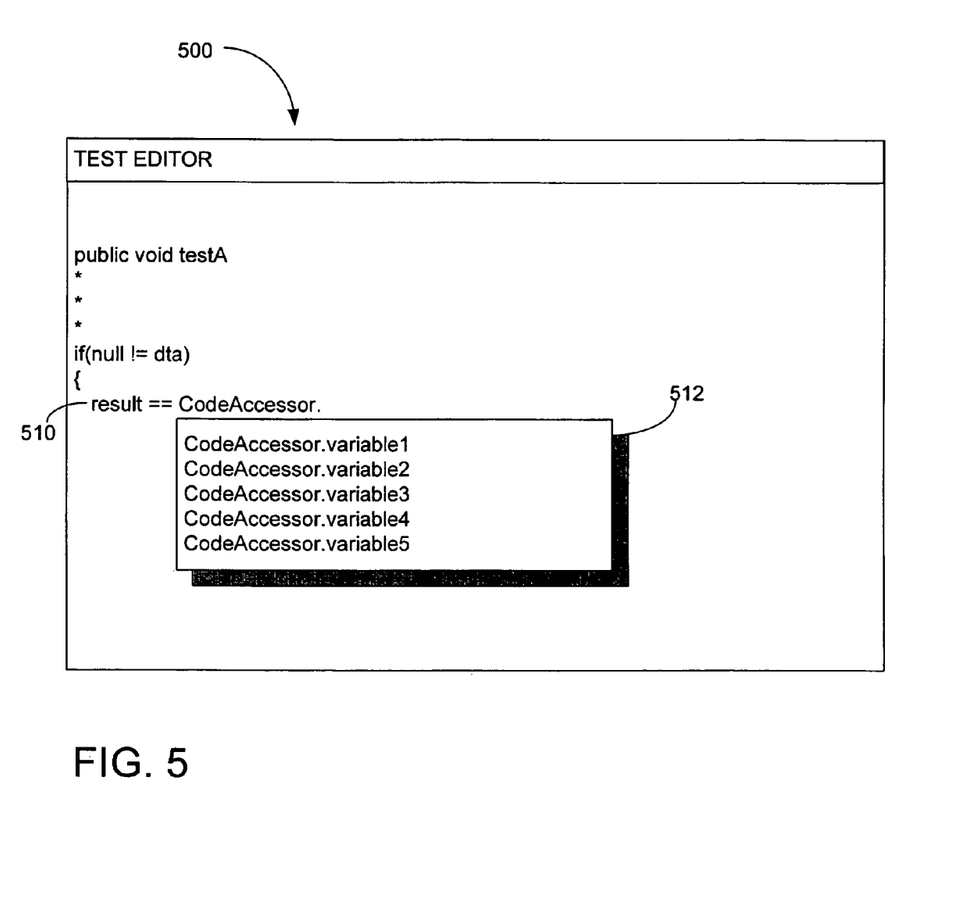
FIG. 5 is a sketch of user interface according to an embodiment of the invention.

FIG. 5 shows an additional aspect of a development environment made possible with the software configuration described above. FIG. 5 illustrates an interface 500 to a test editor, such as may be used by a human programmer developing tests in development environment 310. Interface 500 displays program statements, such as statement 510, as the human programmer is writing a test program.

Interface 500 also includes a supplemental display area 512, here illustrated as a pop-up window. Supplemental display areas may be used to display information relevant to the human user while writing test programs. In this example, supplemental display area 512 displays information about the accessor used to access the unit under test that is the target of this test program.

Even if the unit under test is not defined at the time the test is written, information needed to access it can be available through an accessor, as indicated in FIG. 5. In this way, a feature such as Intellisense may operate in the development environment.

In the illustrated embodiment, the specific information displayed depends on context. In the example pictured in FIG. 5, a human user has typed a portion of an instruction 510. Instruction 510 contains a partial reference to a variable within a code accessor, which may be used to access the unit under test. That portion of the instruction is sufficient to identify that what has been typed needs to be completed by the name of a variable defined within the code accessor. Accordingly, pop-up window 512 contains a list of the variables that are defined within the code accessor. Rather than typing out the full name of the variable, a user may select the intended variable from the list in pop-up window 512. Selecting an entry from a list is simpler and less prone to errors than requiring the user to type the full identifier for that entry.

This approach is not limited to simply displaying names of variables. A list of choices may be presented whenever a partial instruction in connection with other context information provides enough information to identify the set of choices. The approach can be applied to functions, interface or other structures that may be used in a program. Identification and display of the set of choices may be performed as in the prior art. The approach for executing units under test in the host environment is compatible with the use of an accessor to make available the information needed to create the information of the type displayed in FIG. 5.

Having thus described several aspects of at least one embodiment of this invention, it is to be appreciated that various alterations, modifications, and improvements will readily occur to those skilled in the art.

For example, the above described software architecture does not depend on the specific hardware architecture on which the host environment and development environment are executed. The host environment and development environment can execute on the same single or multi-processor system. "Remoting" may be between different environments created by running different host applications on one computer and need not be between processes executing on computers, servers or other processors in separate physical locations.

Also, the figures, such as FIGS. 2-4 illustrate software components executing in a development environment or host environment. A test is said to be executing in the host environment if it has access to methods, properties and other context information that is available in the environment. The application used to create or invoke a program need not dictate the environment in which that program executes.

Further, the hardware on which a program executes need not be determinative of its execution environment. As a specific example, when it is desired to test an application for a portable electronic device, such as a PDA or smart phone, it may be desirable to treat the host environment as a separate, remote platform, with all interactions between the host and the development environment being through .NET remoting. Alternatively, it may be desirable to load all or part of the agent and test program into the portable electronic device for execution.

As used herein, it is described that methods and variables that would ordinarily be non-public in the unit under test are reflected through an accessor program. More generally, any parameter of the unit under test may be reflected. The nature or type of parameters that can be reflected through an accessor program may vary based on the specific unit under test or the programming language in which it is prepared.

The use made of the test results is not a limitation of the invention. The test results may provide data on some aspect of the performance of the unit under test. The specific type of performance information will depend on the specific test program. The performance information could indicate whether the unit provides the desired operating result. Alternatively, it could provide information on the execution time of the unit or the processing resources used during execution of the test.

As another example, the specific method of accessing a unit under test could also be varied. It is not required that abstraction be used. Alternatively, more levels of abstraction may be used. As an example, FIG. 4 shows that test adapter 456 accesses test 416 through unit test adapter 458. Additional levels of abstraction could be provided, such as by providing a wrapper around test 416. Alternatively fewer levels of abstraction could be used, such as by having test adapter 456 directly access test 416.

In general, programs shown containing separate blocks in the figures are illustrated in this fashion for simplicity. The functions illustrated by multiple blocks may be combined into a single function, web page or other program element. Alternatively, functions shown performed in a single block may be implemented in multiple program elements. Where the functions of one block as described above are implemented in multiple program elements, those program elements may be viewed in the aggregate as being a single functional block. Conversely, when one program element implements functions illustrated as multiple blocks, that block may be considered the implementation of any or all of the functional blocks.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code.

In this respect, one embodiment of the invention is directed to a computer readable medium (or multiple computer readable media) (e.g., a computer memory, one or more floppy discs, compact discs, optical discs, magnetic tapes, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The term "program" is used herein in a generic sense to refer to any type of computer code or set of instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Terms such as "parameter," "object" and "method" are also used in a generic sense. Though some programming languages define "parameters" in connection with passing values to functions, the term is used herein more generally to refer to any piece of information. Likewise, some programming languages use terms such as "object" and "method" to refer to specific programming constructs. Those unless clearly indicated otherwise, such terms as used herein are not limited to only such constructs.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiment.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Computer Program Listing

The following is a sample of a test that is configured to run in ASP.NET.

```
[TestMethod]
[HostType("ASP.NET")]
[WebServerType(WebServerType.WebDev)]
[UrlToTest("http://localhost/website/default.aspx")]
[PathToWeb(@"c:\websites\website")]
[WebApplicationRoot("/website")]
public void Test( )
{
    System.Web.UI.Page page = TestContext.RequestedPage;
    Assert.IsNotNull(page, "RequestedPage should not be null.");
    PageAccessor accessor = new PageAccessor(page);
    int result = accessor.Add(1, 1);
    Assert.AreEqual(2, result, "1 + 1 should equal 2");
}
```

The following is an example of pseudocode for an implementation of a host adapter:

```
void RunTest (ITest test, IResults results)
{
    // Get the target process-specific context
    ITestContext testContext = GetTargetProcessContext( );
    // Load the appropriate test execution adapter
    ITestAdapter testAdapter = LoadTestAdapter(test);
    // Execute the test
    testAdapter.Run(test, testContext);
    // Feed results back to the test execution shim
    results.AddResults(testAdapter.Results);
}
```

A test execution shim may communicate with such a host adapter through an interface in the form of:

```
interface ITestExecution
{
    void Initialize( );
    void Run(ITest test);
    void CleanUp( );
}
```

The following is an example of a simple accessor class definition that may be used to create an accessor when the class late binds to the unit under test:

```
public class CodeAccessor
{
    public CodeAccessor (PrivateObject privateObject)
    {
        m_privateObject = privateObject;
    }
    public int Add(int x, int y)
    {
        object[] args = new object[] { x, y };
        int ret = ((int) (m_privateObject.Invoke("Add", new System.Type[] { typeof(int), typeof (int)}, args)));
        return ret;
    }
}
```

What is claimed is:

1. A method of testing a program operating in a first environment, the program having a plurality of units, including at least one unit under test, the method comprising:
   operating at least one programmed processor to perform a series of acts, the series of acts being identified by executable instructions with which the at least one programmed processor is programmed, the series of acts comprising:
   a) executing a test agent in a second environment, the test agent specifying a test to be performed in the first environment to test the at least one unit under test and communicating regarding the specified test with the at least one unit under test in the first environment via a non-public interface of the at least one unit under test, wherein the first environment is an executing application program and the program is an add-in to the application program;
   b) executing, in response to executing the test agent, the specified test in the first environment, the executing of the specified test comprising accessing, by the specified test, of non-public attributes, variables or other parameters of the application program of the first environment during the executing of the specified test and further comprising generating a test result indicative of a performance characteristic of the unit under test; and
   c) providing the test result and information regarding at least some of the accessed non-public attributes of the application program of the first environment, non-public variables of the application program of the first environment or other non-public parameters of the application program of the first environment to the test agent through the execution of the specified test, wherein the providing comprises communicating to the test agent in the second environment the test result and the information via the non-public interface of the at least one unit under test.

2. The method of claim 1, wherein the series of acts additionally comprises communicating the test result from the specified test executing in the first environment to the test agent executing in the second environment.

3. The method of claim 2, wherein executing a specified test in the first environment comprises creating an object in the first environment and registering the object with an object in the second environment.

4. The method of claim 3, wherein executing a specified test further comprises:
   a) executing a test object in the first environment; and
   b) communicating between the object in the second environment and the test object through the object in the first environment.

5. The method of claim 2, wherein executing a specified test comprises executing a test adapter in the first environment and invoking with the test adapter the specified test.

6. The method of claim 5, wherein executing a specified test further comprises receiving with the test adapter a parameter indicative of the specified test and invoking a test selected in response to the parameter.

7. The method of claim 5, wherein the first environment comprises an extensible interface and executing a test adapter comprises executing in the first environment a test adapter in response to a command provided through the extensible interface.

8. The method of claim 1, wherein executing a specified test comprises exercising the at least one unit under test through the non-public interface.

9. The method of claim 1, wherein communicating the test result from the specified test executing in the first environment to the test agent comprises communicating the test result to the test agent via a non-public interface of the first environment.

10. The method of claim 1, wherein executing, with the testing component, the specified test in the first environment comprises executing the specified test in the first environment while the executing application program of the first environment is executing in a testing mode.

11. A method of testing a program operating in a first environment, the first environment storing data and including at least one interface to expose a first portion of the data outside the first environment, wherein the first portion of the data exposed by the at least one interface is public data and wherein a second portion of the data not exposed by the at least one interface is non-public data, the program having a plurality of units, at least one of the units being a unit under test, the method comprising:
   operating at least one programmed processor to perform a series of acts, the series of acts being identified by executable instructions with which the at least one programmed processor is programmed, the series of acts comprising:
   a) loading the program in the first environment;
   b) exposing a first interface of an object in the first environment;
   c) receiving with the object an instruction to operate the first environment in a test mode and, in response to the instruction, setting the first environment in the test mode and using the object to load a test adapter of the first environment, the test adapter of the first environment being executed within the first environment and being separate from the at least one unit under test;
   d) using the test adapter executing in the first environment to execute a test of the at least one unit under test in the first environment;
   e) accessing, with the test through the interface, non-public attributes in the first environment, non-public variables in the first environment or other non-public parameters in the first environment during execution of the test, wherein the accessing comprises communicating via a second interface of the unit under test, and wherein the non-public attributes, the non-public variables and the non-public parameters are non-public data not available outside the first environment via the at least one interface; and f) providing information regarding at least some of the accessed non-public attributes, non-public variables or other non-public parameters in the first environment through the first interface to a test agent executing in a second environment.

12. The method of claim 11, wherein providing information in response to execution of a test agent in a second environment comprises executing the test agent in a development environment.

13. The method of claim 11, wherein providing information through the interface in response to execution of a test agent executing in a second environment comprises selecting a test execution shim based on an attribute of the first environment and accessing the interface through the test execution shim.

14. The method of claim 11, wherein loading the program in the first environment comprises loading an add-in program with an application program.

15. The method of claim 11, wherein the first environment is created in a first process and the second environment is created in a second process.

16. The method of claim 11, wherein the series of acts additionally comprises:
  a) reflecting parameters of a unit in the first environment; and
  b) using the reflected parameters to configure the test adapter.

17. A computer-readable storage medium having computer-executable instructions for performing steps implementing a software system providing a development environment in which a test program may be developed for testing a unit of a program operating in one of a plurality of host environments, the computer-executable instructions performing the steps of:

a) creating a test agent configured to execute in the development environment;
b) creating a test execution shim configured to execute in the development environment, configured to interact with the test agent, and configured to provide an interface to at least one of the plurality of host environments; and
c) creating one of a plurality of host adapters, each host adapter configured to execute in one of the plurality of host environments, each host environment being an executing application program and the host adapter being separate from a unit being tested, each host adapter being configured to be used by the test agent to invoke execution of a test program in one of the plurality of host environments, wherein invoking execution of a test program comprises late binding an accessor class of the test program to the unit of the program being tested to provide access to non-public properties of the unit.

18. The computer-readable storage medium of claim 17, wherein the software system additionally comprises computer-executable instructions for performing the steps of:
  a) receiving input from a user specifying a portion of an instruction in a test program; and
  b) selectively displaying in response to the input from a user context sensitive information concerning parameters that may be used in the instruction of the test program to access the unit of the program.

19. The computer-readable storage medium of claim 18, wherein the software system additionally comprises computer-executable instructions for implementing the steps of receiving parameters related to the unit of the program that have been reflected from the unit.

20. The computer-readable storage medium of claim 17, wherein the software system additionally comprising computer-executable instructions for creating an object that configures a test program based on information about the unit of the program reflected from the unit.

* * * * *